United States Patent [19]
Katchman

[11] 3,956,423
[45] May 11, 1976

[54] POLYPHENYLENE ETHERS COMPOSITION CONTAINING N,N'-DI-β-NAPHTHYL-P-PHENYLENE DIAMINE STABILIZER

[75] Inventor: Arthur Katchman, Delmar, N.Y.

[73] Assignee: General Electric Company, Pittsfield, Mass.

[22] Filed: Nov. 25, 1974

[21] Appl. No.: 527,141

[52] U.S. Cl............................ 260/874; 260/42.18; 260/45.7 P; 260/45.75F; 260/45.75 W; 260/45.9 QB; 260/876 R; 260/847 R
[51] Int. Cl.².................. C08L 23/00; C08K 5/16
[58] Field of Search ......... 260/874, 45.9 QB, 876 R

[56] References Cited
UNITED STATES PATENTS

| | | | |
|---|---|---|---|
| 3,383,435 | 5/1968 | Cizek | 260/874 |
| 3,639,508 | 2/1972 | Kambour | 260/876 B |
| 3,700,750 | 10/1972 | Yamanouchi et al. | 260/874 |
| 3,775,374 | 11/1973 | Wolfe, Jr. | 260/75 R |

Primary Examiner—Richard B. Turer
Attorney, Agent, or Firm—William F. Mufatti; Edward A. Hedman; James V. Costigan

[57] ABSTRACT

Novel stabilized compositions of a polyphenylene ether resin and a vinyl aromatic resin are disclosed which include a minor amount of N,N'-di-β-naphthyl-p-phenylene diamine.

12 Claims, No Drawings

POLYPHENYLENE ETHERS COMPOSITION CONTAINING N,N'-DI-β-NAPHTHYL-P-PHENYLENE DIAMINE STABILIZER

The present invention provides novel stabilized compositions of a polyphenylene ether resin and a vinyl aromatic resin that include a minor amount of N,N'-di-β-naphthyl-p-phenylene diamine as a stabilizer.

BACKGROUND OF THE INVENTION

The term "polyphenylene ether resin" includes a family of polymers well known to those skilled in the art, and they are made by a variety of catalytic and non-catalytic processes from the corresponding phenols or reactive derivatives thereof. By way of illustration, certain of the polyphenylene ethers are disclosed in Hay, U.S. Pat. No. 3,306,874 and 3,306,875 and in Stamatoff, U.S. Pat. No. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al, U.S. Pat. No. 3,337,499; Blanchard et al, U.S. Pat. No. 3,219,626; Laakso et al, U.S. Pat. No. 3,342,892; Borman, U.S. Pat. No. 3,344,166; Hori et al, U.S. Pat. No. 3,384,619; Faurote et al, U.S. Pat. No. 3,440,217; and disclosures relating to metal based catalysts which do not include amines, are known from patents such as Wieden et al, U.S. Pat. No. 3,442,885 (copper-amidines); Nakashio et al, U.S. Pat. No. 3,573,257 (metal-alcoholate or -phenolate); Kobayashi et al, U.S. Pat. No. 3,455,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes such as oxidation with lead dioxide, silver oxide, etc., are described in Price et al, U.S. Pat. No. 3,382,212. Cizek, U.S. Pat. No. 3,383,435 discloses polyphenylene ether-styrene resin compositions. Katchman, U.S. Pat. No. 3,663,661 also discloses polyphenylene ether resin compositions. All of the above-mentioned disclosures are incorporated herein by reference.

Compositions of polyphenylene ethers have been known to exhibit inferior physical properties after exposure to thermal stress for prolonged periods. This has resulted in the need for stabilizers that prevent embrittlement of these compositions. Applicant has discovered that the use of N,N'-diβ-naphthyl-p-phenylene diamine in polyphenylene ether compositions provides a composition with greatly enhanced resistance to thermal aging.

Accordingly it is a primary object of this invention to provide polyphenylene ether compositions that have improved resistance to thermal aging.

It is also an object of this invention to provide a new method for imparting to a polyphenylene ether resin resistance to thermal aging.

DESCRIPTION OF THE INVENTION

The present invention provides a thermoplastic molding composition having improved resistance to thermal aging which comprises:

a. a polyphenylene ether resin;
b. a vinyl aromatic resin; and
c. an amount of N,N'-di-β-naphthyl-p-phenylene diamine sufficient to improve the resistance of said composition to thermal aging.

The polyphenylene ether resins are preferably of the formula:

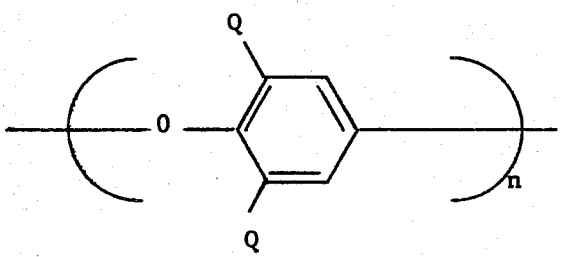

wherein the oxygen ether atom of one unit is connected to the benzene nucleus of the next adjoining unit, $n$ is a positive integer and is at least 50, and each Q is a monovalent substituent selected from the group consisting of hydrogen, halogen, hydrocarbon radicals free of a tertiary alpha carbon atom, halohydrocarbon radicals having at least two carbon atoms between the halogen atom and the phenyl nucleus, hydrocarbonoxy radicals and halohydrocarbonoxy radicals having at least two carbon atoms.

The preferred polyphenylene ether resin is poly (2,6-dimethyl-1,4-phenylene) ether resin.

The vinyl aromatic resin should have at least 25% of its units derived from a compound of the formula:

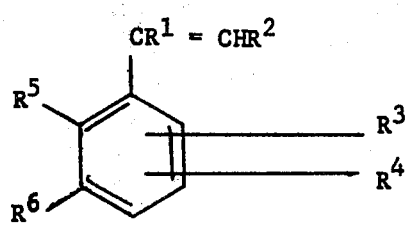

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbons or $R^5$ and $R^6$ may be concatenated together with hydrocarbyl groups to form a naphthyl group.

Materials that may be copolymerized with the vinyl aromatic monomer include those having the general formula:

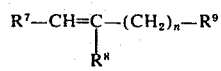

wherein $R^7$ and $R^8$ represent a substituent selected from the group consisting of hydrogen, halogen and alkyl groups of 1–4 carbon atoms, carboalkoxy having from 1–4 carbon atoms or $R^7$ and $R^8$ taken together represent an anhydride linkage (—COOOC—) and $R^9$ is hydrogen, vinyl and alkyl or alkenyl group having 1–12 carbon atoms, cycloalkyl having 3–6 carbon atoms, carboalkoxy having 2 to 6 carbon atoms, alkoxy-alkyl having 2 to 6 carbon atoms, alkylcarboxy having 2 to 6 carbon atoms, cyano, pyridyl and $n$ is a whole number between 0 and 9.

The general formulas set forth above include by way of example, homopolymers such as homopolystyrene and monochloropolystyrene, the modified polystyrenes, such as rubber-modified, high impact polystyrene and the styrene containing copolymers, such as the styrene acrylonitrile copolymers, styrene butadiene copolymers, styrene-acrylonitrile-2-alkyl styrene copolymers, poly-2-methylstyrene, copolymers of ethylvinylbenzene, divinylbenzene, styrene maleic anhydride copolymers and block copolymers of styrene-butadiene or styrene-butadiene-styrene.

The styrene maleic anhydride copolymers are described in U.S. Pat. Nos. 2,971,939; 3,336,267 and 2,769,804 which are hereby incorporated by reference.

The rubber-modified, high impact styrene resins are preferred and these may be made by well known procedures with rubbers such as nitrile rubbers, polybutadiene rubber, styrene-butadiene rubber, polysulfide rubber, ethylene-propylene copolymers, propylene oxide and EPDM.

The compositions of the invention may comprise from 10 to 90 parts by weight of a polyphenylene ether resin; from 90 to 10 parts by weight of a vinyl aromatic resin and from 0.1 to 10 parts by weight of N,N'-di-$\beta$-naphthyl-p-phenylene diamine.

Other additives, processing aids, fillers, reinforcements, flame retardants, pigments and the like may also be present. Reinforcing fillers, such as aluminum, iron or nickel, and the like and non-metals, such as carbon filaments, silicates, such as acicular calcium silicate, asbestos, titanium dioxide, potassium titanate and titanate whiskers, glass flakes and fibers may be used. It is also to be understood that, unless the filler adds to the strength and stiffness of the composition, it is only a filler and not a reinforcing filler.

In particular, the preferred reinforcing fillers are of glass and it is preferrred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling.

If a reinforcing filler is used it may comprise from 1–80% by weight of total composition.

Flame retardants may also be included in the composition such as those disclosed in U.S. Pat. No. 3,671,487 which is hereby incorporated by reference.

Triarylphosphates such as triphenylphosphate may be added as a stabilizer for the compositions. Amounts of from 2–10% by weight of total composition may be employed. Metal sulfides and metal oxides such as titanium dioxide, zinc oxide and zinc sulfide may be added at a level of from 0.05–5% by weight of total composition to exert an additional stabilizing effect. Optionally, trialkylphosphites may also be present as stabilizers. The preferred trialkylphosphite is from 0.05–5% by weight of total composition of tridecylphosphite.

DESCRIPTION OF THE PREFERRED EMBODIMENTS

The following compositions were prepared by dry blending the powdered materials in a Henschel blender, extruding the blended powders in a 28 mm W. P. Twin screw extruder into strands at a stock temperature of 580°F. The strands were chopped into pellets and were thereafter molded into test specimens on a Newbury molding machine. The compositions had the following formulations in parts by weight:

|  | Example I | Control |
|---|---|---|
| Poly(2,6-dimethyl-1,4-phenylene ether (PPO, General Electric) | 500 | 500 |
| rubber modified, high impact polystyrene (Foster Grant 834) | 500 | 500 |
| Triphenyl phosphate | 30 | 30 |
| Tridecylphosphite | 10 | 10 |
| Zinc sulfide | 10 | 10 |
| Zinc oxide | 10 | 10 |
| Titanium dioxide | 10 | 10 |
| N,N'-di-$\beta$-naphthyl-p-phenylene diamine | 10 | — |
| Polyethylene | 15 | 15 |

The molded test pieces were placed in a forced air oven at 125°C. Tensile elongation was measured periodically and the specimen exhibited a brittle break. The results were as follows:

| Example I | 35 days |
|---|---|
| Control | 17 days |

|  | Example II | Control |
|---|---|---|
| Poly(2,6-dimethyl-1,4-phenylene ether | 400 | 400 |
| rubber modified, high impact polystyrene (Foster Grant 834) | 600 | 600 |
| Triphenylphosphate | 80 | 80 |
| Tridecylphosphite | 5.0 | 5.0 |
| Zinc sulfide | 1.5 | 1.5 |
| Zinc oxide | 1.5 | 1.5 |
| Polyethylene | 15 | 15 |
| N,N-di-$\beta$-naphthyl-p-phenylene diamine | 7.5 | — |

Time to embrittlement at 100°C:

|  | Hrs. |
|---|---|
| Example II | 2895 |
| Control | 1225 |

|  | Example III | Control |
|---|---|---|
| Poly(2,6-dimethyl-1,4-phenylene ether | 350 | 350 |
| rubber modified, high impact polystyrene (Cosden 945E) | 650 | 650 |
| N-N'-di-$\beta$-naphthyl-p-phenylene diamine | 5.0 | — |
| Triphenylphosphate | 70 | 70 |
| Tridecylphosphite | 5.0 | 5.0 |
| Polyethylene | 15 | 15 |
| Zinc sulfide | 1.5 | 1.5 |
| Zinc oxide | 1.5 | 1.5 |

Time to embrittlement at 115°C:

|  | Hrs. |
|---|---|
| Example III | 1683 |
| Control | 785 |

Obviously, other modifications and variations of the present invention are possible in the light of the above teachings. It is, therefore, to be understood that changes may be made in the particular embodiments of the invention described which are within the full intended scope of the invention as defined by the ap-

I claim:

1. A thermoplastic molding composition having improved resistance to thermal aging which consists essentially of:
   a. from 10–90 parts by weight a polyphenylene ether resin of the formula

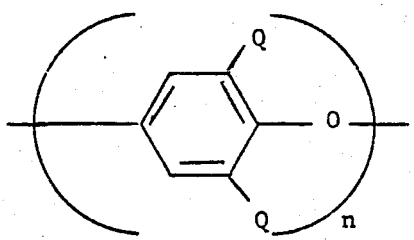

wherein the oxygen ether atom of one unit is connected to the benzene nucleus of the next adjoining unit, $n$ is a positive integer and is at least 50, and each Q is a monovalent substituent selected from the group consisting of hydrogen, halogen, hydrocarbon radicals free of a tertiary alpha carbon atom, halohydrocarbon radicals having at least two carbon atoms between the halogen atom and the phenyl nucleus, hydrocarbonoxy radicals and halohydrocarbonoxy radicals having at least two carbon atoms;
   b. from 90–10 parts by weight of a vinyl aromatic resin wherein at least 25% of the units of said vinyl aromatic resin are derived from a monomer of the formula:

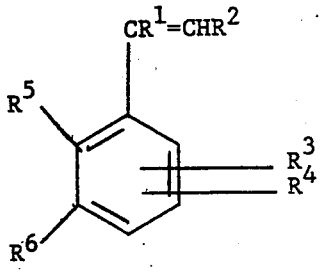

wherein $R^1$ and $R^2$ are selected from the group consisting of lower alkyl or alkenyl groups of from 1 to 6 carbon atoms and hydrogen; $R^3$ and $R^4$ are selected from the group consisting of choloro, bromo, hydrogen and lower alkyl of from 1 to 6 carbon atoms, $R^5$ and $R^6$ are selected from the group consisting of hydrogen, lower alkyl and alkenyl groups of from 1 to 6 carbons or $R^5$ and $R^6$ may be concatenated together with hydrocarbyl groups to form a naphthyl group and from 0.1 to 10 parts by weight of N,N'-di-$\beta$-naphthyl-p-phenylene diamine sufficient to improve the resistance of said composition to thermal aging.

2. The stabilized composition of claim 1 wherein said polyphenylene ether resin is poly (2,6-dimethyl-1,4-phenylene) ether.

3. The stabilized composition of claim 2 wherein said vinyl aromatic resin is a high impact rubber modified styrene resin.

4. The stabilized composition of claim 3 which includes from 2–10% by weight of total composition of a triarylphosphate; from 0.05–5% by total weight of composition of metal sulfide and metal oxide and from 0.05–5% by weight of total composition of a trialkylphosphite.

5. The stabilized composition of claim 4 which includes triarylphosphate, zinc oxide, zinc sulfide and tridecylphosphite.

6. The stabilized composition of claim 1 including a flame retardant amount of a flame retardant agent.

7. The stabilized composition of claim 1 including a reinforcing amount of a reinforcing filler.

8. The stabilized composition of claim 6 including a reinforcing amount of a reinforcing filler.

9. The stabilized composition of claim 4 including a stabilizing amount of triphenylphosphate.

10. The stabilized composition of claim 9 including a stabilizing amount of zinc sulfide.

11. The stabilized composition of claim 10 including a stabilizing amount of tridecylphosphite.

12. The stabilized composition of claim 11 including a stabilizing amount of zinc oxide.

* * * * *